(12) United States Patent  (10) Patent No.: US 7,695,024 B2
Ostergren et al.  (45) Date of Patent: Apr. 13, 2010

(54) QUICK CONNECTOR

(75) Inventors: Kristian Ostergren, Alingsas (SE); Akemi Conradsson, Bredaryd (SE)

(73) Assignee: ITW Sverige AB, Moelndal (SE)

( * ) Notice: Subject to any disclaimer, the term of this patent is extended or adjusted under 35 U.S.C. 154(b) by 55 days.

(21) Appl. No.: 12/065,314

(22) PCT Filed: Sep. 29, 2006

(86) PCT No.: PCT/IB2006/002705

§ 371 (c)(1), (2), (4) Date: Feb. 29, 2008

(87) PCT Pub. No.: WO2007/036794

PCT Pub. Date: Apr. 5, 2007

(65) Prior Publication Data

US 2008/0224469 A1  Sep. 18, 2008

(30) Foreign Application Priority Data

Sep. 30, 2005  (SE) ..................................... 0502149

(51) Int. Cl.
*F16L 37/00*  (2006.01)
(52) U.S. Cl. .......................... 285/308; 285/305; 285/321
(58) Field of Classification Search .................. 285/305, 285/321, 312, 311, 314, 308, 315
See application file for complete search history.

(56) References Cited

U.S. PATENT DOCUMENTS 3,428,340 A * 2/1969 Pelton .......................... 285/95
3,450,424 A   6/1969 Calisher
4,244,608 A   1/1981 Stuemky 4,991,880 A * 2/1991 Bernart ........................ 285/321

(Continued)

FOREIGN PATENT DOCUMENTS

DE  3440753 A1  5/1986

(Continued)

OTHER PUBLICATIONS

ISR for PCT/IB2006/002705 mailed Feb. 21, 2007.

(Continued)

*Primary Examiner*—David E Bochna
(74) *Attorney, Agent, or Firm*—Lowe Hauptman Ham & Berner LLP

(57) ABSTRACT

Coupling for connecting of pipe shaped sections comprising a first pipe section and a coupling device arranged to connect the first pipe section with a second pipe section. When joined together, the first pipe section is arranged to receive the second pipe section in such a way that the first pipe section and the second pipe section forms an overlapping region. The wall of the first pipe section is provided with a through hole in the overlapping region and the coupling device is adapted to protrude through the hole. The coupling device is at least at one of its ends slidably attached in such a way that a rotational displacement around, and essentially perpendicular to, the axial direction of the pipe section will give rise to a change between a first position for locking, wherein said coupling device is protruding on the inner side of the first pipe section, and a second position for release wherein the coupling device essentially not is protruding.

9 Claims, 5 Drawing Sheets

U.S. PATENT DOCUMENTS

| | | | | |
|---|---|---|---|---|
| 5,607,190 | A * | 3/1997 | Exandier et al. | 285/93 |
| 5,632,512 | A * | 5/1997 | Guitoneau | 285/321 |
| 5,662,628 | A | 9/1997 | Hollands | |
| 5,704,658 | A * | 1/1998 | Tozaki et al. | 285/305 |
| 5,855,399 | A * | 1/1999 | Profunser | 285/305 |
| 6,260,889 | B1 * | 7/2001 | Tozaki et al. | 285/321 |
| 6,371,528 | B1 | 4/2002 | Kimura | |
| 6,517,120 | B1 * | 2/2003 | Miyajima et al. | 285/305 |
| 6,637,779 | B2 | 10/2003 | Andre | |
| 6,637,780 | B2 * | 10/2003 | Miyajima et al. | 285/305 |
| 6,702,335 | B2 * | 3/2004 | Bahner et al. | 285/305 |
| 2004/0051313 | A1 | 3/2004 | Trouyet | |

FOREIGN PATENT DOCUMENTS

| | | |
|---|---|---|
| DE | 10047872 A1 | 10/2001 |
| EP | 0737458 A2 | 10/1996 |
| EP | 0750152 A1 | 12/1996 |
| EP | 0926420 A2 | 6/1999 |
| EP | 1065427 A1 | 1/2001 |
| EP | 1304521 A2 | 4/2003 |
| FR | 2454074 | 11/1980 |
| GB | 1303475 | 1/1973 |

OTHER PUBLICATIONS

ISR for 0502149-8 mailed Mar. 22, 2006.

* cited by examiner

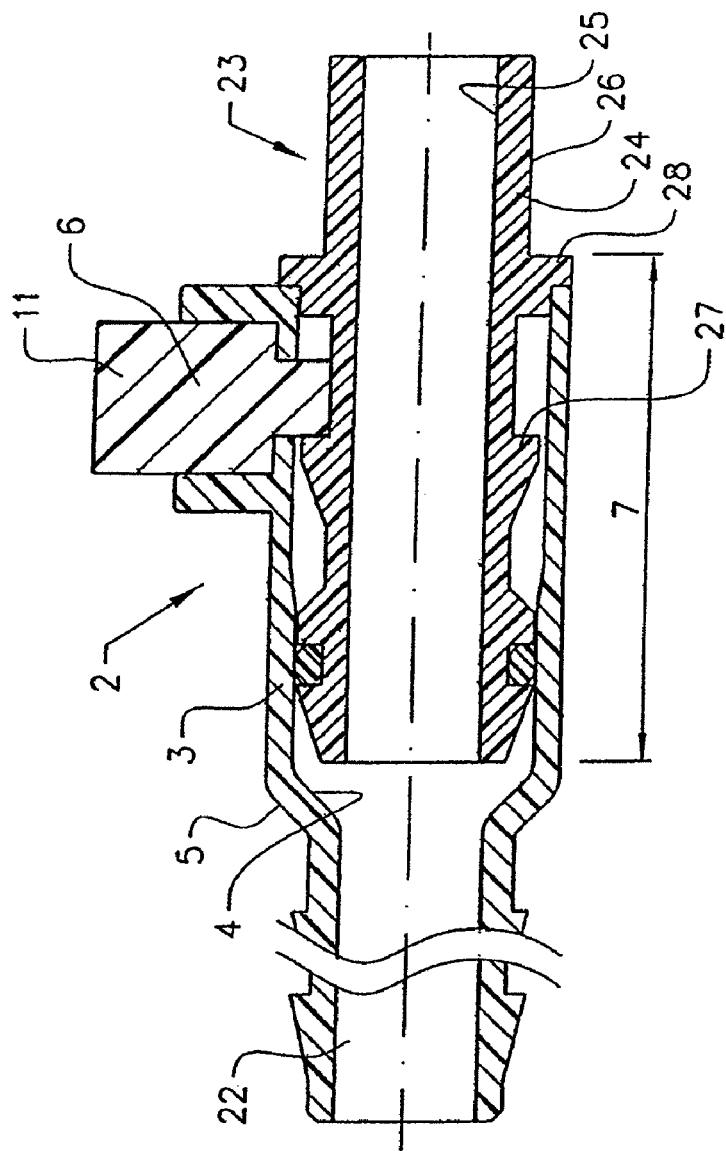
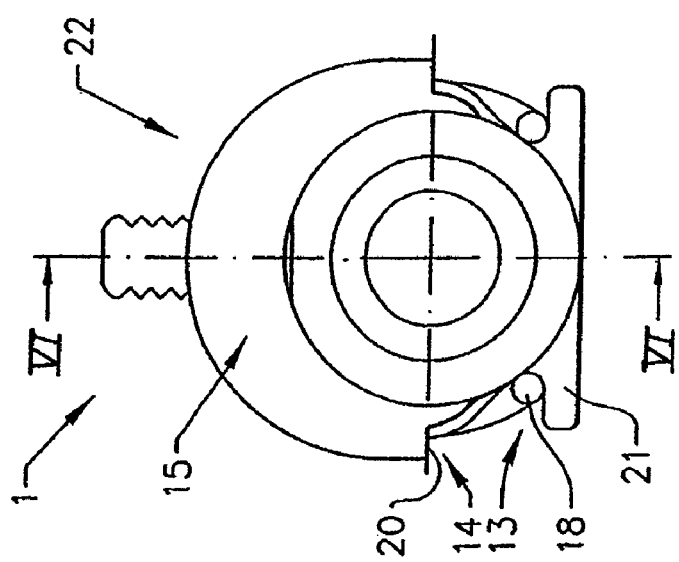
FIG. 6
FIG. 5

QUICK CONNECTOR

RELATED APPLICATIONS

The present application is based on International Application Number PCT/IB2006/002705 filed Sep. 29, 2006, and claims priority from Swedish Application Number 0502149-8 filed Sep. 30, 2005, the disclosures of which are hereby incorporated by reference herein in their entirety.

TECHNICAL FIELD

The invention relates to a coupling for pipes and a piping system wherein such a coupling is used. The invention is in particular related to couplings which can release and connect different pipe sections by a simple operation, so called quick connectors.

BACKGROUND ART

It is previously known a multitude of different solutions for connecting pipes in such a way that they later on can be released relatively easy in one simple operation.

In for example DE 34 40 753, US 2004/0051313 and U.S. Pat. No. 3,753,582 are shown 3 different quick connectors which have the same basic construction and function. Each of the described quick connectors comprises a locking spring dip having two shanks connected to a connecting branch. The two shanks are resilient and shaped to form protrusions which projects into a desired portion of the connector and thereby locking the connection in a first, locking position when at rest. In order to change to a second, releasing position, the connecting branch is pressed radially inwards while the shanks are pressed radially outwards by cooperating with wedge-shaped elements spreading the shanks apart.

Other quick connectors similar to the constructions described above are disclosed in DE 100 47 872, EP 1 304 521 and U.S. Pat. No. 4,244,608. These connectors mainly differs from the above mentioned ones in that they are changed between the first, locking position to the second releasing position by pulling the connecting branch radially outwards.

Still further examples of quick connectors are disclosed in for example U.S. Pat. No. 5,152,555 where a quick connector is described which connects two pipes by the use of a device reminding of a clips which consists of a ring shaped, open section provided with protruding parts which stretches through the outer pipe and squeeze around the inner pipe. In U.S. Pat. No. 6,709,026 another arrangement is shown which also uses an arrangement of a device reminding of a clip. U.S. Pat. No. 5,909,901 describes a tool intended to be used for attaching and releasing a clip which connects two parts of pipes.

Even though there are a multitude of known solutions, another kind of solution may be desired depending on the specific demands which are made in different fields of use and for different dimensions. Thus, there is a need for quick connectors which fulfils different specifications concerning simplicity in constructional details, a secure connection of the end parts of the pipes and which is able to release the connected parts from each other by the use of one simple operation.

DISCLOSURE OF THE INVENTION

By the present invention has a quick connector been achieved, in order to fulfil the demands of simplicity in constructional details and being user friendly, which solves the desired specifications of being easy to manufacture while the connector may be operated in an easy manner to securely couple and discouple the connected ends of the pipes.

A coupling, for connecting of pipe shaped sections, manufactured according to the invention is recognised by comprising a (first) pipe end part and a coupling device. The pipe end is adapted to receive and surround still another pipe end in such a way that these both end parts of pipes from two pipes, when connected, form en overlapping region. The (first) pipe end part comprised in the coupling is provided with a through hole in the pipe wall in the region of the pipe end which forms the overlapping region. The coupling device is provided with two shanks, each one of them having a free, distal end, and is arranged in such a way that at least a part of it, e.g. the shanks, surrounds the pipe end part in such a way that some part of the coupling device is adapted to fit into the through hole. The coupling device is further adapted to be able to change between a locking position and a releasing position. In the locked position, the coupling device is arranged, either directly or indirectly by cooperation with some other device, in such a way that a projection or protruding part is formed through the hole on the inner side wall of the pipe end. The coupling device is, at least at one of its distal ends of the shanks, slidably attached to the first pipe and may move in a direction essentially perpendicular to the pipe ends longitudinal extension, i.e. perpendicular to the axial direction of the pipe. In the case of a circular pipe, this means for example that at least one end of the coupling device may be arranged to move along the outer side of the pipe in such a way that its motion pattern forms an arc of a circle, i.e. the free end of the shank will make a turning motion around the longitudinal axis of the pipe. The coupling device is also provided with some kind of device, which can be pushed upon, e.g. in a direction corresponding to a rotational motion around the longitudinal axis of the pipe, in such a way that displacement of the at least one, slidably attached end will cause the part of the coupling device protruding through the hole of the first pipe to move outwardly, towards the outer side of the wall of the pipe, in order to change the coupling device between the locked position and the releasing position. It should be realised that the motion of the protruding part of the coupling device not only need to be towards the outer side wall of the pipe. In case the pipes are circular and the essential motion of the protruding part of the coupling device is directed radially outwards, this motion may be combined with a circular or semicircular motion along the pipe wall or axial motion along with the axial extension of the pipe.

As already has been indicated implicitly above, the pipes may as well have other shapes as circular, for example octagonal, square, oval shaped or other desired shapes. However, the invention is mainly adapted and developed for round pipes, because round pipes are the predominating shape of pipes and tubing for different fluids, and it is expected to have its major practical use for this kind of pipes.

Material and dimensions of the pipes and tubing which forms part of the invention is not essential for the inventive idea but may be adapted to the kind of media for which the pipes are intended to be used for and by the kind of stress the surrounding environment may form. Commonly used materials are plastic, cupper, metal or the like. The dimensions of the pipes is neither limiting for the invention but can be of any desired size. However, the connection is primarily intended to be used for pipes having a relatively small diameter, between 3 and 50 mm, even more preferably between 3 and 35 mm and most preferably between 5 and 20 mm. The quick connector is for example intended in cars for connections between different pipes or tubing which is used for windscreen washer fluid. To be noted, the coupling device itself may be of another material than the pipes.

Furthermore, it is obvious that the protuberance which is used to be pressed upon in order to change the coupling device between the locked position and the releasing position may be of many different kinds and may for example be a pin, a thread attached to the coupling device or a notch or the like arrangement which may be adapted for some kind of tool like a screwdriver or the like.

The most obvious way of transferring a force to the coupling device from the pressing protuberance is to press the protuberance in a direction essentially perpendicular to the axial extension direction of the pipe parts i.e. in the same direction which the free ends of the coupling devices are intended to move. As will be clear in the examples describing embodiments of the invention, the protuberance will in this case be pressed so as to create a rotating motion around the longitudinal axis of the pipe in order to influence at least one of the ends of the shanks to slide in a rotating motion along the outer side of the pipe. To be noted, the rotational movement needed is quite short for most cases and the free end only need to rotate a fraction of a complete circle, e.g. 10-20 degrees or even less. However, the pressing protuberance may also for example be pressed in axial direction and by an arrangement of the coupling device in combination with the pipe (for example bevels or a conical outer surface of the pipe end), these may cooperate in such a way that the protruding part on the inner side of the pipe end no longer protrude.

The coupling device may have many different designs but according to a preferred embodiment it is a circular section which approximately corresponds to three quarter of a ring. By having a circular element which is long enough to encircle more than half a circle, it is easy to use a resilient force of the material of the coupling device to let it stay attached to the pipe. In addition, by having this design, the ring may fit into round pipes but also fit other geometrical shapes of pipes.

Furthermore, the coupling device may be resiliently attached to the coupling in such a way that it is in a locked position at rest and, when subjected to sufficient pressure against the protuberance, will be loosen in such a way that the coupling device will pass into the second, releasing position. According to the invention, this may occur as a result of making the coupling device of a flexible material.

The coupling device may be attached to the pipe, at one or both of its ends, in such a way that one of its ends is prevented from moving freely (a partly pivotal motion may be possible) while the second end of the coupling device is displaced along the first pipe end in a direction essentially perpendicular to the pipe ends axial direction, e.g. a rotating movement around the longitudinal axis of the pipe, when there is a change between the first, locked position and the second, releasing position. The coupling device may be arranged in such a way that both its ends are slidably arranged and depending on in which direction the device is displaced (or rotated) either of the both ends may work as the fixed end as well as the end which is displaced. According to a preferred embodiment of this arrangement are the ends of the coupling arranged to be displaced between two, for each one of the ends, predefined positions on the first pipe section. Both ends of the coupling device may at rest, when the coupling device is in its locked position, be arranged in the position which defines the essentially fixed position of the end which is not moving when there is a change from the locked position to the releasing position.

According to a preferred embodiment, the coupling device is fixed at its location by a resilient attachment which may be achieved by making the coupling from a resilient material. Hence, some parts of the coupling device, e.g. the shanks, may be subject to elastic deformation when the coupling device changes from its locking position to its releasing position. In case sufficient force is applied to, for example, the pressing protuberance in order to after the position, the end towards which the force is directed will thus be the essentially fixed end and the other end will be moved from its first resting position to a second position while the coupling changes from its locked position to its releasing position.

The coupling may also preferably be attached to the pipe end in such a way that these are joined to each other in both the first, locked position and the second, releasing position.

The invention is also directed towards a connecting system which comprises a coupling as disclosed above and further comprises a second pipe end. The second pipe end comprises a pipe wall with en outer circumference and a geometric design which is adapted in such a way that it may fit into the first pipe end, i.e. the outer circumference of the second pipe end is smaller than the inner circumference of the first pipe end. The second pipe end is thus at least partly introduced into the first pipe in such a way that these form an overlapping region. The pipes may have different diameter and geometric designs but it is obvious that the outer circumference of the inner pipes must be smaller than the inner circumference of the outer pipe in the whole part forming the overlapping region.

The inner pipe in the connecting system should preferably be provided with a projection, hole or indentation on its outer side in the part of the inner pipe which forms the overlapping region when connected. These protrusions, holes or indentations are intended to engage in cooperative way with the part of the coupling device protruding through the outer pipe in such a way that displacement of the two pipes in axial direction is essentially prevented. These protrusions, holes or indentations may be constructed in such a way that they runs along the complete, outer circumference and allow, in the case the pipes is round, the pipes to be turned radially in relation to each other. It is also possible that the inner pipe is provided with an indentation which is intended to fit in with en protruding part in such a way that radial turning not is possible.

In case the inner pipe is provided with some kind of protrusion, it can be beveled so that the inner pipe easily may be introduced by being pressed together with the outer pipe whereby the protruding part of the inner side of the outer pipe is pressed away as both the pipes are joined together. At its second side, the projection may for example be provided with a right angled edge in such a way that the pipes not may be separated unless the coupling device changes from the first, locked position to the second, releasing position.

In the following part, different embodiments of the invention will be described with reference to figures illustrating how to practice the invention. However, it should be noted that these figures only disclose certain aspects of the invention and that it may be modified and used in other embodiments. For example it can be mentioned that the invention disclosed herein only is shown for round pipes but it may also be used for other geometrical shapes.

BRIEF DESCRIPTION OF THE DRAWINGS

FIG. 5 shows a front view of the quick connector according to the first embodiment.

FIG. 6 shows an axial cross section of the quick connector in FIG. 5 along the line VI-VI when two pipe sections are connected.

EMBODIMENTS OF THE INVENTION

Figure 4A:
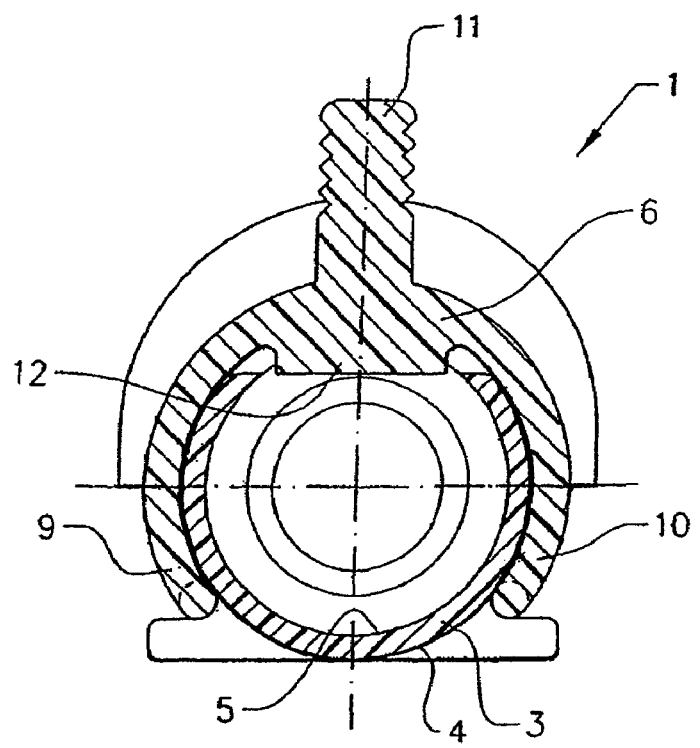
FIG. 4 shows a radial cross section of the quick connector along the line IV-IV in FIG. 2 in a locking position (FIG. 4A) and in a releasing position (FIG. 4B).
Figure 4B:
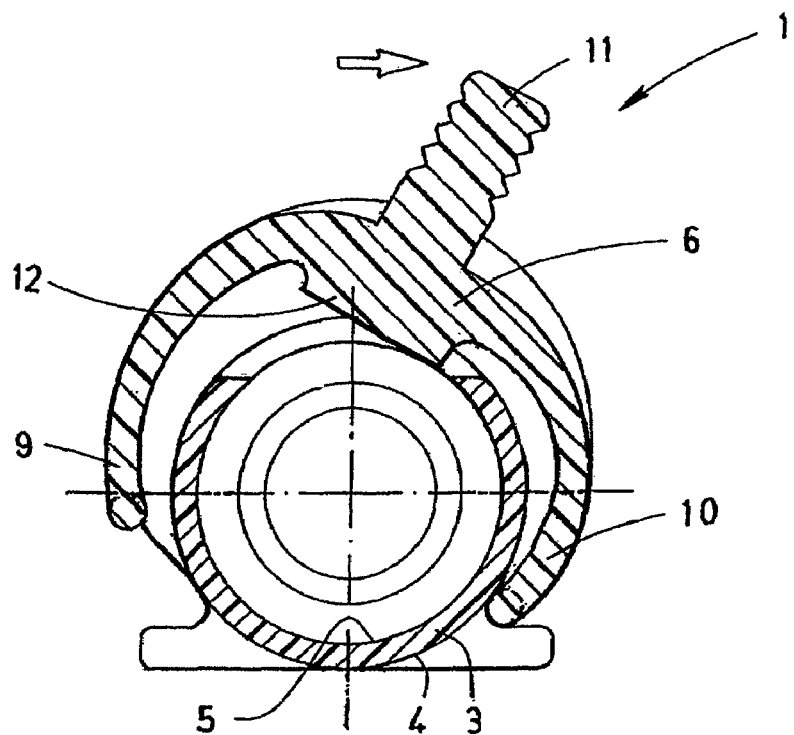
Figure 7:
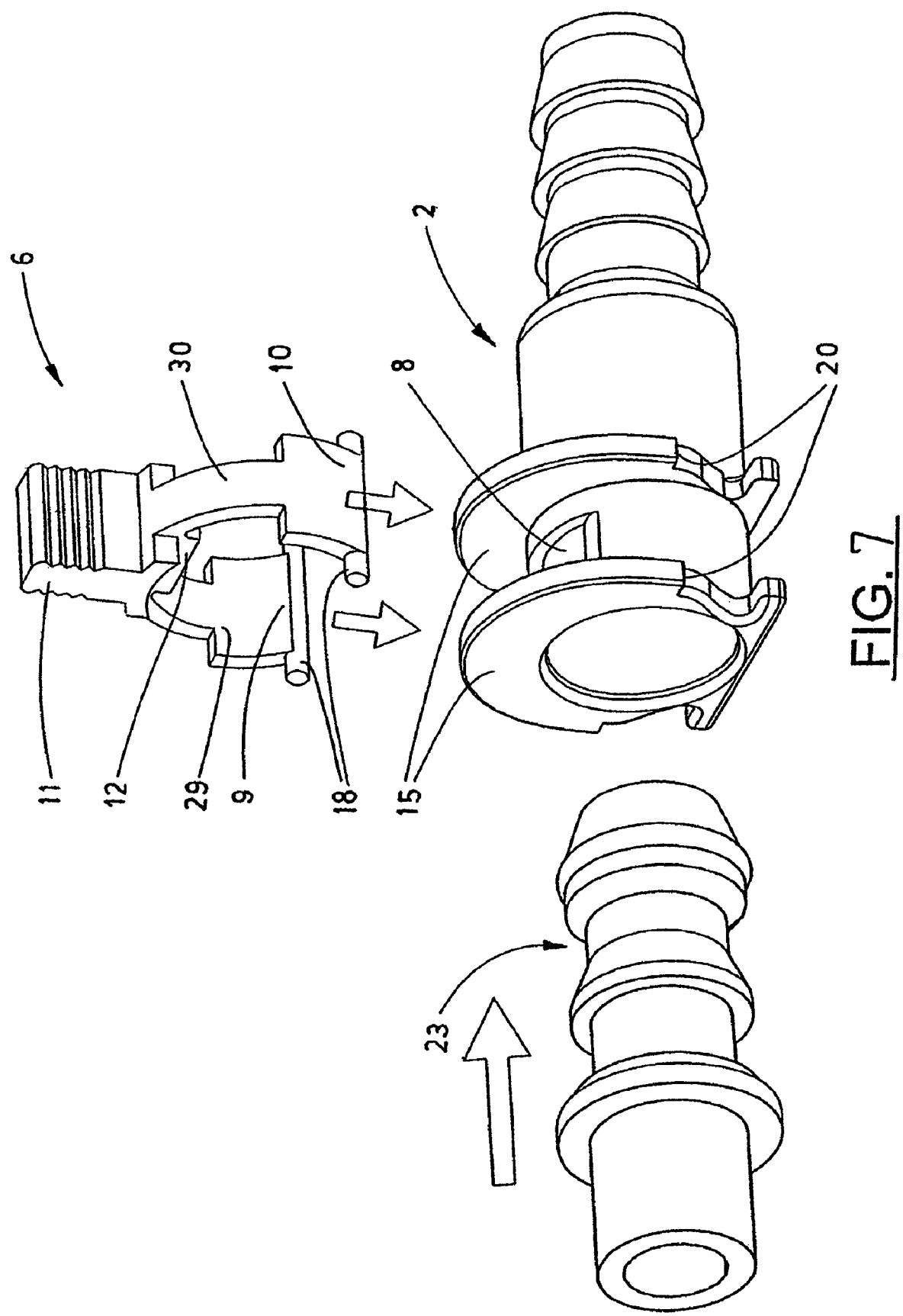
FIG. 7 shows the connecting system of FIG. 6 when the pipes and the coupling device forming the coupling are separated from each other.

In FIG. 1-7 is shown a coupling (1) according to an embodiment of the invention. As can be readily seen in these figures, the coupling comprises a first pipe section (2), having a circular cross section presenting an essentially longitudinal axial direction, and a coupling device (6). In FIG. 4 or 6 is best shown that the first pipe section (2) has a pipe wall (3) which presents an inner side (4) having a first inner circumference and an outer side (5) having a first outer circumference. The coupling further comprises a coupling device (6) arranged to connect said first pipe section (2) with a second pipe section (23). The first pipe section (2) is arranged to receive and surround a second pipe section in such a way that the second pipe section at least partly can be introduced into the first pipe section (2) and both the pipe sections thereby form en overlapping region (7) (see FIG. 7) when connected. The first pipe section (2) is provided with a through hole (8) (See FIG. 7) in the part of the first pipe section (2) which, when connected with the second pipe section, form en overlapping region (7). The coupling device (6) is arranged to at least partly enclose and be in contact with the first pipe section (2) in the overlapping region (7) wherein the coupling device (6) is adapted to protrude into the through hole (8) in the first pipe section. In this embodiment of the invention, the coupling device (6) is shown as a ring-shaped piece which is cut parallel with its axial axis and form a piece which is arranged to enclose about ¾ of the pipe section (2). The coupling device (6), which is best illustrated in FIG. 7, comprises a pair of shanks (29, 30) which each one has a free, distal end (9, 10). The shanks (29, 30) are extending symmetrically from a central part of the coupling device (6). However, the shanks (29, 30) may as well extend asymmetrically from the coupling device. The shanks (29, 30) surround the pipe wall (3) of the first pipe section (2) in order to attach the coupling device (6) to the first pipe section (2). The coupling device is slidably attached at its free, distal ends (9, 10) to allow a rotating motion along the first pipe section (2) in a direction essentially perpendicular to the axial direction of the pipe section (2). Even though this is a preferred embodiment, it is not necessary that both the ends (9 and 10) are slidably attached but it is enough that only one of them may move this way. Such an arrangement will thus only allow the coupling (6) to be turned to its releasing position in one direction. The coupling device (6) is further provided with a protuberance (11) which by being pressed upon displaces one of the ends (9, 10) of the coupling device (6) along the first pipe section (2) in a direction essentially perpendicular to the axial direction of the pipe section (2). The protuberance (11) is constructed in such a way that, at enough pressure in a direction along the outer side (5) of the first pipe section in a direction essentially perpendicular to the axial direction of the pipe section (2), the protruding part on the inner side (4) of the first pipe section (2) of the coupling will move towards the outer side (5) of the pipe wall (3). This motion will cause that the coupling device (6) will change between a first, locked position (see FIG. 4A) and a second, releasing position (see FIG. 4B) by radially moving the protruding part (12) of the coupling device (6), protruding on the inner side (4) of the wall (3) of the first pipe section (2), outwards in such a way that it will be located with its innermost part essentially in line with or radially beyond the inner side (4) of the wall (3) of the first pipe section (2) in such a way that the coupling device (6) not will be in a cooperating engagement with any part of the second pipe section.

The coupling device (6) is resiliently attached in such a way that at a certain pressure on the protuberance (11) in the shown direction (see FIG. 4B), the protruding part of the coupling device (6) will be moved out of its first, locking position to the second, releasing position. At removal of the required pressure, the coupling device (6) will resiliently return and the protruding part (12) will once again be located in the first, locking position. The coupling device (6) is also attached to the first pipe section (2) in such a way that these are joined to each other in both the first, locked position and the second, releasing position. This connection is the result of the resiliency of the resilient material from which the cut, ring shaped piece, which forms the coupling device (6), is made. The material is rigid enough so that it is needed a rather large force to separate it completely from the pipe section (2).

According to the shown embodiment is the protruding part, designed as a projection (12) on the coupling device (6), adapted to fit into the through hole (8) in the first pipe section (2) in such a way that the projection (12) in the first, locked position causes a protrusion on the inner side (4) of the first pipe section (2). The resilient force is caused due to the coupling device (6) being manufactured from a resilient, flexible material and the coupling device is arranged to at rest, in cooperation with its attachments, be in a locking position. The ends (9, 10) of the shanks (29, 30) of the coupling device (6) are arranged to be displaced between two predefined positions (13, 14) for each one of the ends (9, 10) on the outer side (5) of the first pipe section (2). The lower position (13) corresponds to the position at rest for the coupling device (6) wherein a displacement of at least one of the ends (9 or 10) to the upper position (14) will cause the coupling device to change from its locking position to its releasing position, i.e. from the configuration shown in FIG. 4A to the one shown in FIG. 4B.

Figure 1A:
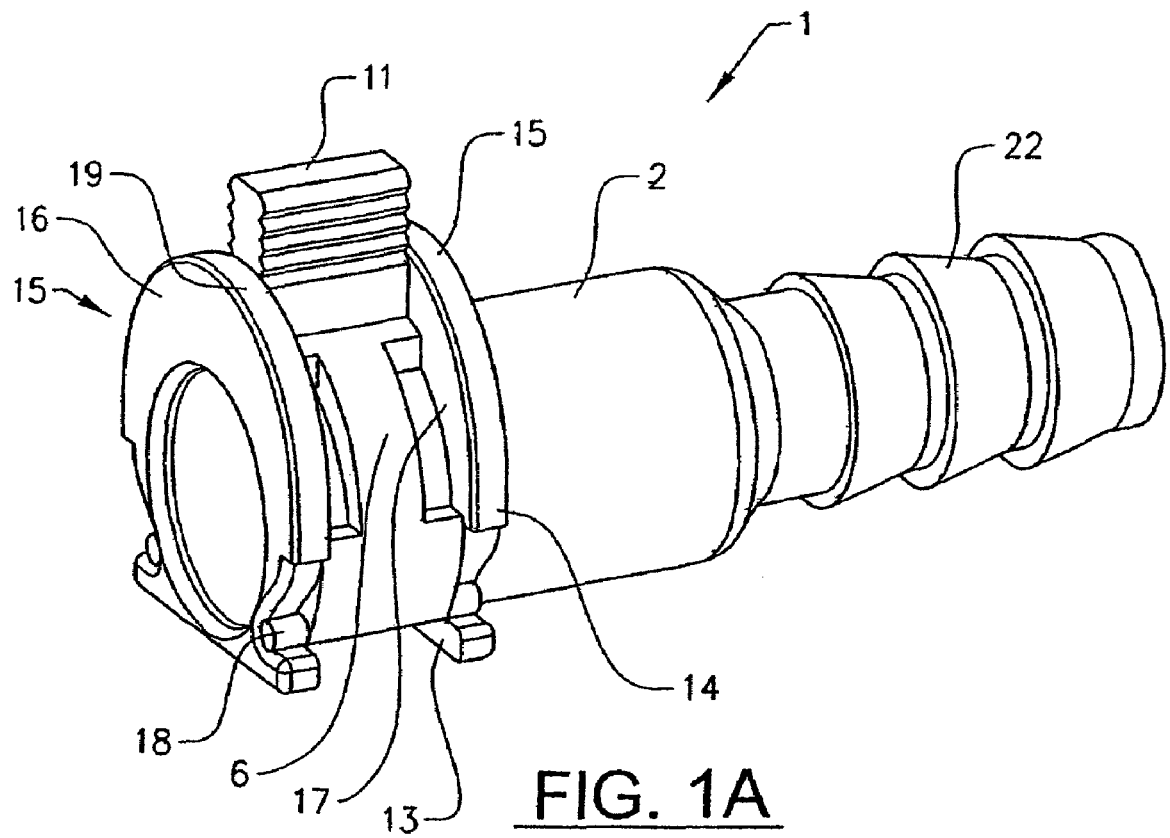
FIG. 1 shows a perspective view of first embodiment of a quick connector according to a first version (FIG. 1A) and a second version (FIG. 1B).
Figure 1B:
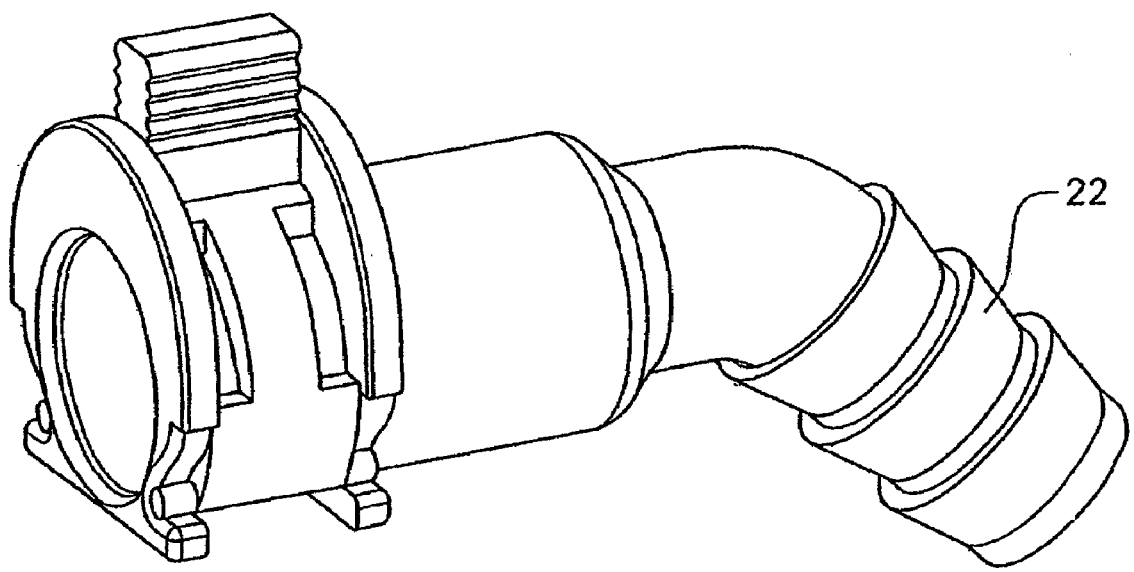
Figure 2:
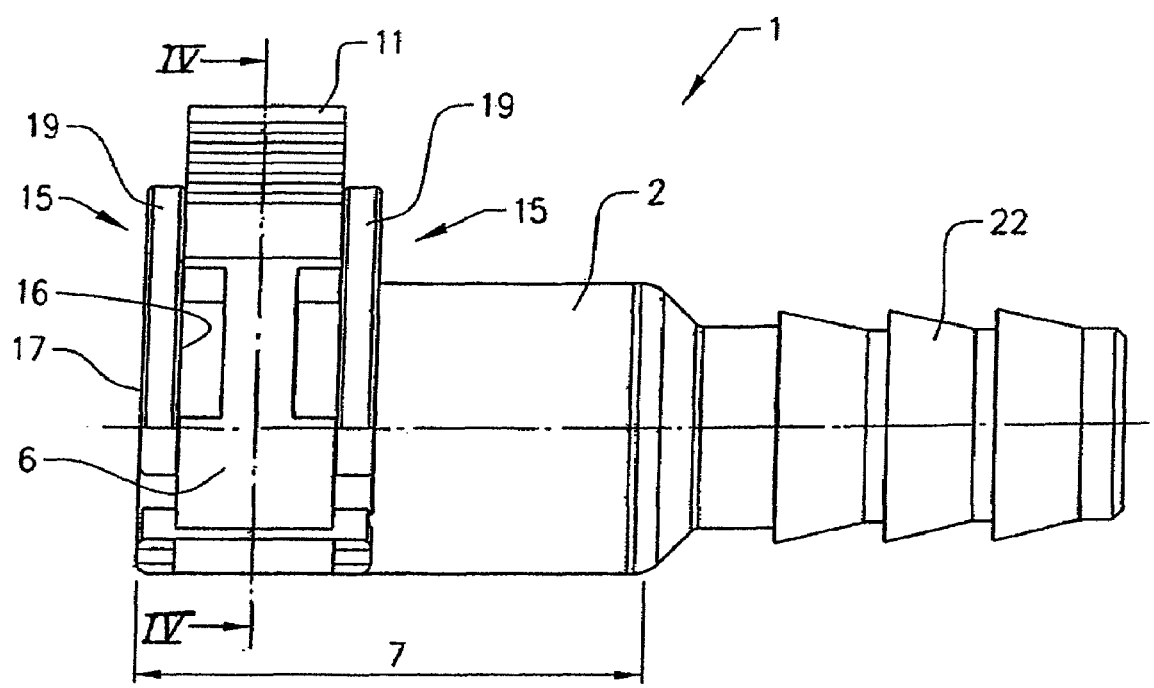
FIG. 2 shows a side view of the quick connector according to the first embodiment.
Figure 3:
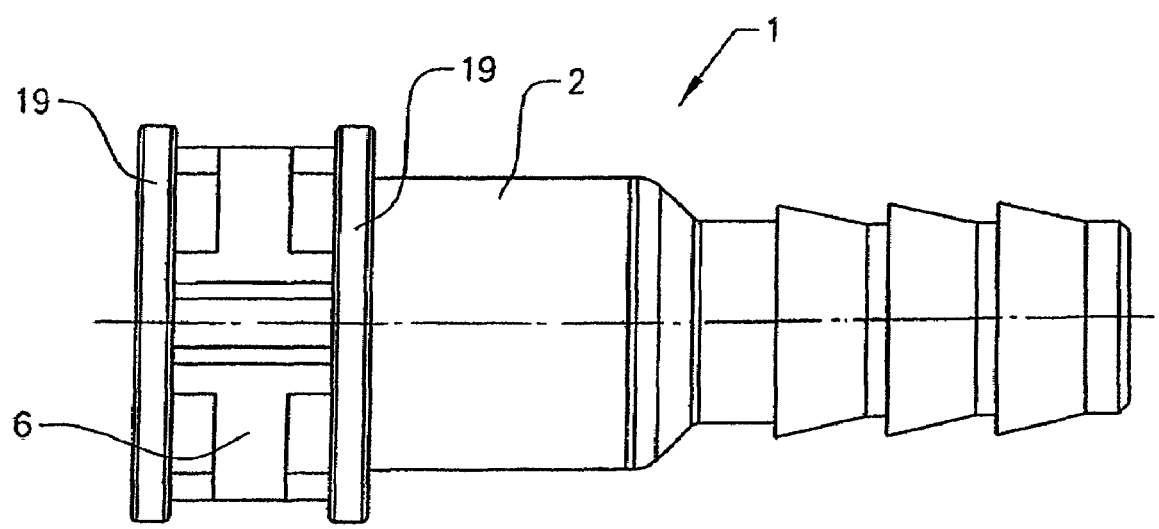
FIG. 3 shows en view from above of the quick connector according to the first embodiment.

As can be best seen in FIG. 2, the coupling device (6) is prevented from displacement in axial direction by a pair of arc shaped discs (15) which are located on the outer side of the first pipe section (2). The arc shaped discs (15) are in this case moulded as an integral part of the pipe section (2). The discs (15) are located in such a way that its plane is perpendicular to the axial direction of the pipe section and each one of the disc comprises an inner side (16) facing the coupling device and an outer side (17) turning away from the coupling device. As shown in FIG. 7 are the ends (9, 10) of the shanks (29, 30) of the coupling device (6) provided with a pin (18). With reference to FIG. 1, it is clear that when the coupling device (6) is mounted to the pipe section (2), the pin (18) stretches in the axial direction in such a way that both its ends reaches pass the arc shaped discs (15) and rests upon the edges (19) of the discs (15) which are facing radially outwards with respect to the first pipe section (2). The arc shaped discs (15) are at the ends (9, 10) of the coupling device beveled in such a way that the coupling device (6) is allowed to move along the outer side (5) of the first pipe section (2) while the ends of the pins (18) slides on the radially outwards facing edge (19) of the disc (15). The edge (19) of the disc (15) is also provided with a shoulder (see reference number 20 in FIG. 5 or FIG. 7), which works as a stop for the pin (18), and forms the upper, predefined position (14) for the ends (9, 10) of the coupling device, where one of the ends (9 or 10) of the shanks (29 or 30) of the coupling device (6) is located when it is in its releasing position (se FIG. 4B). The lower, predefined position (14) for the ends (9, 10) of the coupling device is formed by hooks (21) which are arranged to receive the pin (18) in such a way that these hooks (21) forms a stop and prevent the end (9 or 10), towards which the coupling device (6) is pushed by applying a pressure on the protuberance (11), from moving. Hence, if the protuberance (11) is pushed as indicated in FIG. 4B, the result will be that the protuberance (11) and the projection (12) will perform a partly rotating and a partly radially outwards directed motion while the left one of the ends (9) will move along the edges (19) of the discs (15) while the other end (10) is prevented by the hooks (21) from sliding along the outer side (5) of the first pipe section (2).

The above described construction of how the different predefined positions may be constructed may be modified and soled in a multitude of different ways. In order to perform the invention in a desired way, it is preferred that there are stops which define different positions of the coupling device corresponding to a locking position and a releasing position. The stops and different positions are preferably indicated in such a way that it is easy to know when there is a change from a locking to a releasing position, e.g. by the tactile feeling or sound of a "snap"-action or by having a visual indication of the positioning of the coupling device (6). The design with the beveled section of the edge (19) of the disc (15), i.e. the part of the disc between the hooks (21) forming the lower stop position (13) and the shoulder (20) forming the upper stop position (14), creates a tactile feeling and sound of snap action when changed between open and locked position. Furthermore, it can also be visually recognized in which position the protuberance (11) is positioned as an indication of if the coupling device being in its locking position (FIG. 4A) or releasing position (4B). In addition, this design also provides that there is a motion radially outwards of the shanks (29, 30) and its associated projection (12). The beveled edges (19) of the discs (15) also helps in keeping the coupling fixed in its locking position while the beveling at the same time allows the connection to be changed to its releasing position without the need of open up any kind of locking mechanism in order to make the change possible.

In the disclosed embodiment is the pipe end section (2) of the coupling (1) integrally moulded with a hose connection (22) in such a way that the coupling (2) by one simple operation may connect and disconnect a tubing to a pipe section (23) adapted to be connected to the coupling (2).

I FIG. 6 is shown how the coupling (1) may be used in order to connect the first pipe section (2) to a second pipe section (23) intended therefore. The first pipe section (2) is arranged to receive and surround the second pipe section (23) which presents an essentially longitudinal axial direction and which pipe wall (24) has an inner side (25) with a second inner circumference and an outer side (26) with a second outer circumference. The first inner circumference of the first pipe section (2) is thus larger than the second outer circumference of the second pipe section (23) whereby the second pipe section (2) at least partly can be introduced into the first pipe section (2). Both the pipe sections thereby form an overlapping region (7) when connected.

The second pipe section (23) is on its outer side (26) provided with a first protrusion (27) in the part of the second pipe section (23) which, when connected to the first pipe section (2), forms the overlapping region (7). The projection (27) on said second pipe section (23) engages in a cooperative way with the part protruding through the inner side (4) of the first pipe section of the coupling device (6). In this way, displacement of the two pipe sections (2, 23) away from each other in the axial direction is prevented.

As shown in FIG. 6, the first projection (27) on the outer side (26) of the second pipe section (23) is arranged with a beveled edge on its front side, i.e. the side which at introduction of the second pipe section (23) in the first pipe section (2) will meet the protruding part (12) of the coupling device (6), which penetrates through the hole (8) of the first pipe section (2). Because the coupling device is resiliently attached to the first pipe section (2), the coupling device may be pressed outwards at insertion of the second pipe section (23) in the first pipe section (2). The rear side of the projection, i.e. the side which when the pipe sections (2, 23) are joined together in the locked position is in close contact with the protruding part of the coupling device (6), is perpendicular to the outer side (26) of the second pipe section and form a locking shoulder. According to an embodiment, the projection (27) thus forms a ring shaped element located on the outer side (26) of the second pipe section having a beveled front edge and a perpendicular rear edge.

In FIG. 6, it is also shown that the second pipe section (23) is provided with a second protrusion (28) which is arranged to form a shoulder lying close to the mouth of the first pipe section. In this way, a locking is formed which not allow any possibility for displacement in any axial direction when the coupling device (6) is located in its locking position.

There are of course possibilities of different variations of this locking arrangement and for example could a locking shoulder, corresponding to the second protrusion (28) of the second pipe section, be located on the inner side (4) of the first pipe section and form a shoulder engaging with the mouth of the second pipe section (23).

FIG. 7 shows the different parts which form the coupling arrangement in a disassembled state. In normal cases, the coupling device (6) is never completely detached from the first pipe section (2) as shown in this figure. When the coupling is assembled, the coupling device (6) is only intended to be turned around the longitudinal axis of the first pipe section (2) such that the pin (18) of one end (9 or 10) of a shank (29 or 30) is essentially fixed in the lower predefined position (see reference number 13 in FIG. 5) while the other end (10 or 9) of the other shank (30 or 29) is allowed to move slidingly in a rotational motion until it stops at the upper predefined position (see reference number 13 in FIG. 5).

The above described embodiments of the coupling and the connecting system are only specific embodiments of how the invention may be performed and shall only be regarded as examples of the general idea of the invention which is described in the claims.

The invention claimed is:

1. A coupling arrangement for connecting pipe shaped sections comprising:
   a first pipe section, presenting an essentially longitudinal axial direction, which pipe wall presents an inner side having a first inner circumference and an outer side having a first outer circumference
   a coupling device arranged to connect said first pipe section with a second pipe section, said coupling device comprising two shanks, each shank provided with a free, distal end wherein
   said first pipe section is arranged to receive and surround a second pipe section with a second outer circumference, which is smaller than the first inner circumference of the first pipe section, so that the second pipe section at least partly can be introduced into the first pipe section and both pipe sections thereby form an overlapping region when connected said first pipe section is provided with a through hole in the pipe wall in the part of the first pipe section which, when connected with the second pipe section, form the overlapping region said coupling device is arranged to at least partly enclose and be in contact with the first pipe section in the overlapping region wherein the coupling device is adapted to protrude into and through the through hole in the first pipe section said coupling device further adapted to be able to change between a first position for locking of the connection, wherein said coupling device causes a protruding part on the inner side of the first pipe section, and a second position for release of the connection wherein the coupling device essentially not is protruding on the inner side of the first pipe section said coupling device is at least at one of its free, distal ends of the shanks attached slidably along the first pipe section in a direction essentially perpendicular to the axial direction of the pipe section so as to be able to perform a rotating movement around the longitudinal axis of the pipe section said coupling device is further provided with a protuberance which, when pressed upon in a turning direction around the longitudinal axis of the first pipe section, displaces one of the ends of the coupling device along the first pipe section in a direction essentially perpendicular to the axial direction of the pipe section in a rotational movement along the circumference of the pipe section in such a way that the part protruding through the inner side of the first pipe section of the coupling device will move towards the outer side pipe wall in a partly radially, outwards direction and partly rotational movement around the longitudinal axis of the pipe section in order to change the coupling device between the first, locked position and the second, releasing position;

said first pipe section includes a pair of arc shaped disks disposed on an outer side of the first pipe section and have a plane perpendicular to the axial direction of the first pipe section and each disc comprises an inner side facing the coupling device and an outer side turned away from the coupling device, the discs having edges which are facing radially outward with respect to the first pipe section and are provided with shoulders said coupling device further comprising a pair of shanks extending from a central part of the coupling device and are configured to attach the coupling device to the first pipe section, the shanks include pins disposed at ends of the shanks and are configured to stretch in an axial direction in such a way that both ends thereof reach past the arc shaped discs and rests upon the edges of the discs and are configured to travel between the shoulders of the edges of the discs and hooks located at a lower predefined position forming a stop.

2. A device according to claim 1 characterized in that said coupling device is resiliently attached in such a way that at a certain pressure against the protuberance in a direction for a rotating movement around the longitudinal axis of the pipe section, the locking projection will be guided out of its first, locked position to the second, releasing position, said coupling device arranged to, at removal of desired pressure, return to the first, locked position by the resilient attachment.

3. A device according to claim 1 characterized in that said coupling device, when changing between the first, locked position and the second, releasing position, is essentially fixed in a direction essentially perpendicular to the axial direction of the pipe section at one of its ends while the second end of the coupling device is displaced, by pressing on the protuberance in order to displace the coupling device, along the first pipe section in a direction essentially perpendicular to the axial direction of the pipe section.

4. A device according to claim 1 characterized in that said coupling device is provided with a projection adapted to the through hole in the first pipe section in such a way that the projection in the first, locked position causes a protruding part on the inner side of the first pipe section.

5. A device according to claim 1 characterized in that said coupling device at both its ends is slidably arranged along the first pipe section in a direction essentially perpendicular to the axial direction of the pipe section.

6. A device according to claim 5 characterized in that the ends of the coupling device are arranged to be displaced between two predefined positions, for each one of the ends, on the outer side of the first pipe section.

7. A device according to claim 1 characterized by that the coupling device is attached to the pipe section in such a way that these are joined to each other in both the first, locked position and the second, releasing position.

8. A connecting system according to claim 7 characterized in that on an outer side of said second section, a projection is disposed in the part of the second pipe section which, when connected to the first pipe section, form said overlapping region whereby said protrusion on said second pipe section in a cooperating manner engages with the protruding part of the coupling device through the through hole in such a way that displacement of the two pipe sections in an axial direction essentially is prevented.

9. A connecting system comprising a coupling device according to claim 1 comprising a second pipe section presenting an essentially longitudinal axial direction, which pipe wall presents an inner side with a second inner circumference and an outer side with a second outer circumference, which is smaller than the first inner circumference of the first pipe section, in such a way that the second pipe section at least partly is connected with the first pipe section and both the pipe sections thereby form an overlapping region when connected.

* * * * *